UNITED STATES PATENT OFFICE.

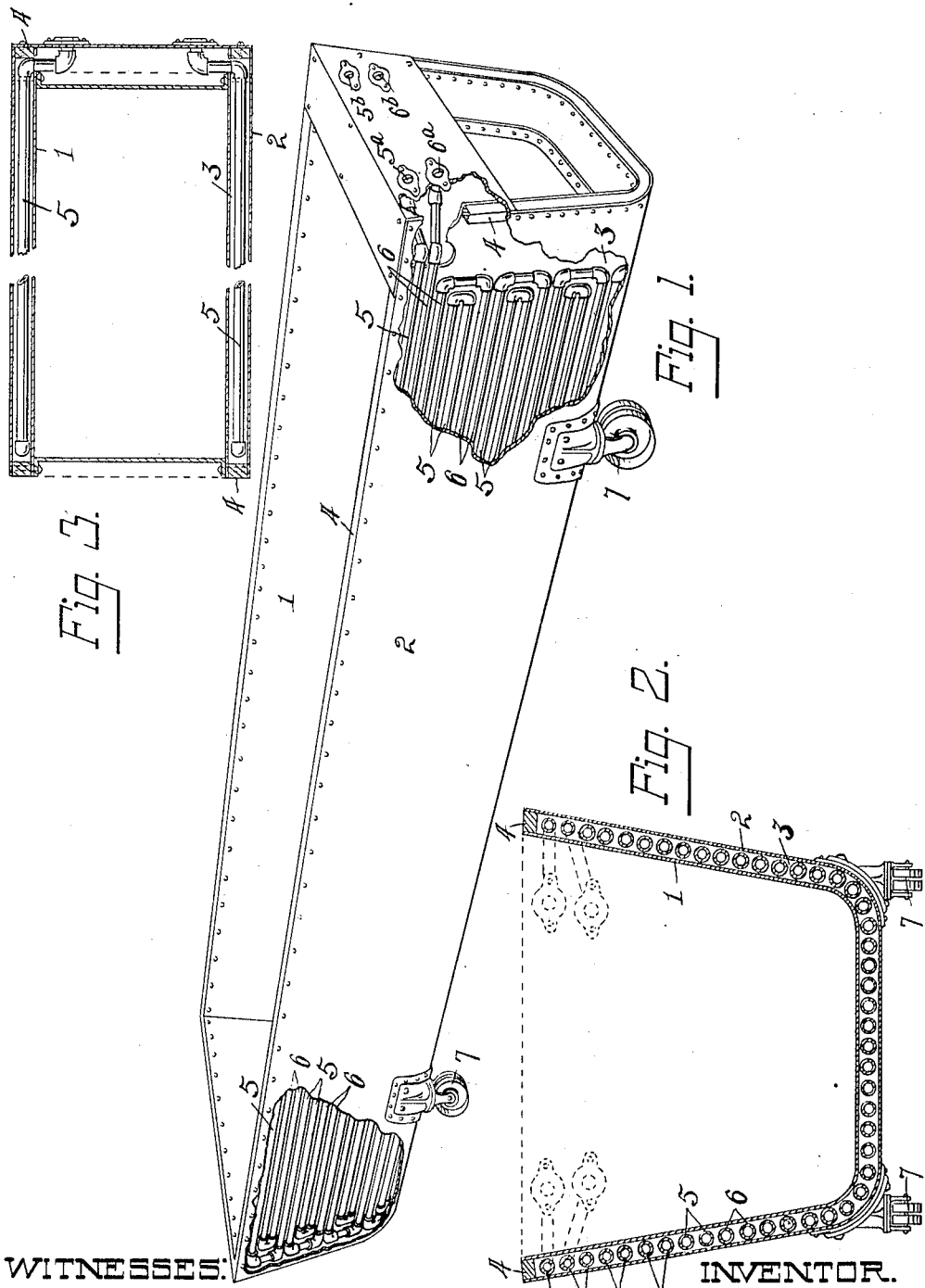

IRVING B. GOLDEN, OF TOLEDO, OHIO.

DOUGH RETAINER OR TROUGH.

1,040,929.

Specification of Letters Patent.

Patented Oct. 8, 1912.

Application filed June 13, 1912. Serial No. 703,419.

*To all whom it may concern:*

Be it known that I, IRVING B. GOLDEN, a citizen of the United States, and a resident of Toledo, in the county of Lucas and State of Ohio, have invented a certain new and useful Dough Retainer or Trough; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to apparatus employed in connection with the manufacture of bread, and has particular reference to improvements in the means employed for holding the dough during the fermentation and rising stage.

In the making of bread, the dough, after being thoroughly mixed and kneaded, is placed in the retainer or trough to permit its fermentation. The fermentation stage is the most important stage in bread making, as the making of wholesome and uniform bread, which is of even and proper flavor, texture, appearance and color, depends upon the success of the fermentation process. Under the present conditions and methods of making bread, so far as I am aware, the dough is uncertain, and reaches various stages of fermentation, such as the alcoholic, acetous and putrefactive stages, depending largely upon the temperature of the dough during fermentation. The alcoholic stage, which is the one desired, produces a light and porous bread of even texture and fine grain and color. The acetous stage, when present in proper amounts, improves the flavor of the bread, but, as soon as the dough becomes hot or cold, retards the alcoholic fermentation and the resultant bread will be heavy and poor in quality. The putrefactive, or last stage of fermentation, occasionally causes what is dreaded and termed " rope in bread," the result of excessive heat and strong and early fermentation. In the making of breads from the various kinds of doughs, as white, rye, sweet, water, hearth, and salt-rising, and those known under the latest scientific development in bread making as " straight doughs," and also doughs for the older types of sponge breads, it is important to keep the doughs at certain constant predetermined temperatures during fermentation, the temperature for the different doughs varying according to requirements.

The object of my invention is to facilitate and improve upon the present bread making methods by the provision of means, in combination with a dough retainer or trough, which enables the interior temperature thereof to be regulated to a nicety to permit a control of the fermenting action, as desired, and enables the obtaining and holding of the exact degree of temperature required for any special or individual dough to produce a uniform bread, which is wholesome and even in flavor, texture, appearance and color.

The invention is fully described in the following specification, and while, in its broader aspect, it is capable of embodiment in numerous forms, a preferred embodiment thereof is illustrated in the accompanying drawings, in which,—

Figure 1 is a perspective view of a dough trough or retainer embodying the invention, with portions broken away. Fig. 2 is an enlarged cross-section thereof, and Fig. 3 is a reduced horizontal longitudinal section of the same with the central portion broken away.

The dough retainer or trough embodying my invention is shown, in the present instance, as being of elongated trough-like form with its bottom and sides formed of the spaced inner and outer walls or shells 1 and 2 of sheet metal, or other suitable material, which walls coöperate to form a U-shaped chamber 3 the entire length of the retainer. The walls or shells 1 and 2 are held in proper spaced relation at their top edges and ends by spacing strips 4, as indicated.

The chamber 3 is intended to receive a set of forwardly and backwardly extending pipes, one being for the passage of hot water, steam, or other suitable heating medium, and the other for the passage of cold water, or other suitable cooling medium, whereby the temperature within the chamber 3, and the consequent temperature of the interior of the retainer, can be regulated to a nicety by the passage of one or the other or both of such mediums in proper proportion through the respective pipes. The pipes 5 and 6, which may be termed the heating and cooling pipes, respectively, of the apparatus, have their inlet ends at one end of the retainer, as at 5ª and 6ª respectively and thence extend forward and backward within the chamber 3 throughout the length thereof in alternating pairs, which preferably continue from one top edge to the other top edge of such chamber.

In the preferred arrangement of the pipes they extend from one end to the other of the chamber 3 in adjacent parallel relation, with the return length of the pipe 6 lying adjacent to and disposed with its companion between the forwardly extending and return lengths of the pipe 5. The pipe 5 then turns and extends forwardly again in adjacent relation to the return length thereof and is disposed with such return length between the said return length of the pipe 6 and the next forwardly extending length thereof, the lengths of the two pipes continuing in this alternating-pair relation throughout the breadth of the chamber 3, as shown in the drawing. When the pipes have thus traversed forward and backward from the upper portion of one side of the chamber 3 to the upper portion of the other side thereof they have their exit from an end thereof, as at 5ᵇ and 6ᵇ. The arrangement of the pipes in this manner enables the interior temperature of the retainer to be regulated to a nicety and evenly maintained throughout the entire area thereof as the heating and cooling fluids may be passed through the respective pipes, as desired for such purpose. A cover, not shown, is intended to be placed over the open top of the retainer when in use to close the same to the outside temperature. The retainer is preferably mounted on casters 7 to render the same easily portable.

By providing a dough retainer or trough with this form of temperature regulating means it is possible to easily regulate the temperature as the various doughs may require and to maintain the same constant during the fermentive stage so that the proper state of fermentation may be obtained to produce light and porous bread of even texture and fine grain and color.

I wish it understood that the invention is not limited to any particular arrangement or construction of the parts except in so far as such limitations are specified in the claims.

Having thus described my invention, what I claim as new and desire to secure by Letters Patent, is—

1. An apparatus of the class described having its sides and bottom hollow to form a chamber around the sides and bottom of the interior of the apparatus, and separate means for passing heating and cooling fluids backward and forward through said chamber from adjacent to one top edge to adjacent to the other top edge thereof to permit a regulation of the interior temperature of the apparatus.

2. An apparatus of the class described having a chamber which encompasses the dough retaining compartment thereof, and separate non-communicating passages for heating and cooling fluids extending to and fro within said chamber in alternating pairs throughout substantially the entire area of the chamber to permit an even regulation of the temperature within the compartment.

3. A dough retainer having its sides and bottom formed with spaced inner and outer shells forming a closed U-shaped chamber around the dough compartment, a pipe for a heating fluid extending forward and backward within said chamber lengthwise thereof and from one top portion to the other top portion thereof, said pipe having its inlet adjacent to one top portion and its outlet adjacent to the other top portion of such chamber, and a pipe for a cooling fluid extending forward and backward through said chamber lengthwise of and from one top portion to the other top portion of said chamber with its lengths arranged in adjacent pairs which alternate with adjacent pairs of the lengths of the other pipe, said cooling medium pipe having its inlet adjacent to one top portion of the chamber and its outlet adjacent to the other top portion thereof, substantially as described.

In testimony whereof, I have hereunto signed my name to this specification in the presence of two subscribing witnesses.

IRVING B. GOLDEN.

Witnesses:
  C. W. OWEN,
  FLORENCE AUL.

---

Copies of this patent may be obtained for five cents each, by addressing the "Commissioner of Patents. Washington, D. C."